United States Patent [19]

Dzioba et al.

[11] Patent Number: 5,031,737
[45] Date of Patent: Jul. 16, 1991

[54] TRANSMISSION/BRAKE INTERLOCK

[75] Inventors: Donald L. Dzioba, Midland; William D. Cymbal, Freeland, both of Mich.

[73] Assignee: General Motors Corporation, Detroit, Mich.

[21] Appl. No.: 471,468

[22] Filed: Jan. 29, 1990

[51] Int. Cl.⁵ .............................................. B60K 41/26
[52] U.S. Cl. .................................. 192/4 A; 74/483 R; 74/502.6; 180/271; 200/61.89
[58] Field of Search ....................... 192/4 R, 4 A, 4 C; 74/483 R, 483 K, 502.4, 502.6; 180/271; 200/61.89

[56] References Cited
U.S. PATENT DOCUMENTS

| | | | |
|---|---|---|---|
| 4,096,930 | 6/1978 | Viscardi | 192/4 A |
| 4,239,947 | 12/1980 | Breitung et al. | 200/61.89 |
| 4,768,610 | 9/1988 | Pagel et al. | 180/271 |
| 4,790,206 | 12/1988 | Thomas | 74/502.4 |
| 4,905,802 | 3/1990 | Gotoh | 192/4 A |
| 4,917,224 | 4/1990 | Gokee | 192/4 A |
| 4,919,242 | 4/1990 | Muramatsu et al. | 192/4 A |
| 4,936,431 | 6/1990 | Shinpo | 192/4 A |
| 4,938,042 | 7/1990 | Muramatsu | 192/4 A X |

Primary Examiner—Richard Lorence
Attorney, Agent, or Firm—Donald F. Scherer

[57] ABSTRACT

A motor vehicle interlock device (10) has an actuating assembly (11) connected by a push-pull control cable (13) to a dead bolt throw assembly (12). The dead bolt throw assembly (13) has a dead bolt (60) which is engageable with a lock engaging lug (20) of a transmission, operating range, drive selector. A plunger (30) is biased by a first compression spring (39) into abutting engagement with the lever arm (15) of a foot-operated brake such that when the foot-operated brake pedal is applied, the plunger (30) is urged toward the lever arm (15) The first end (46) of the core (48) in a push-pull control cable (13) is attached to the plunger (30), and the second end (73) of the core (48) is attached, by a lost motion connector (75), to a dead bolt (60). As such, when the plunger (30) follows the lever arm (15) the push-pull control cable (13) translates the dead bolt (60) out of engagement with the lock engaging lug (20), thereby freeing the transmission, operating range, drive selector. An embodiment of an actuating assembly utilized with the interlock (10) is also presented as being used in conjunction with a combined brake light and cruise control switch assembly (90).

5 Claims, 3 Drawing Sheets

TRANSMISSION/BRAKE INTERLOCK

TECHNICAL FIELD

The present invention relates generally to interlocks between the transmission and other vehicle operating devices, and more particularly, to an interlock between the transmission and the service brakes.

BACKGROUND OF THE INVENTION

To ensure that a vehicle operator has depressed the service brake pedal prior to shifting from "Park" to "Drive" or "Reverse" in an automatic transmission, interlocks between the transmission and the vehicle brakes have been proposed. For example, U.S. Pat. No. 4,768,610 issued to Pagel et al., Sept. 6, 1988, is directed toward an electro-mechanical device which disables power to the gear selecting mechanism of the transmission unless the brake pedal has been depressed.

It is readily apparent that electro-mechanical devices require that the electric power remains uninterrupted.

Other devices have included mechanical interlocks between the drive range selecting lever and the foot-operated brake pedal. One such device is disclosed in U.S. Pat. No. 4,096,930 issued to Viscardi, June 27, 1978. The device disclosed therein includes a pin and hole arrangement which locks the transmission range selecting lever. By applying the foot-operated brake, the pin is withdrawn from the hole.

SUMMARY OF THE INVENTION

It is, therefore, a primary object of the present invention, to provide a device which will preclude moving the drive range selecting lever for the transmission from the part position to one of the drive ranges without first depressing the vehicle brake pedal.

It is another object of the present invention to provide an interlock between the transmission, operating range, drive selector and the foot-operated brake pedal of a motor vehicle.

It is still another object of the present invention, to provide an interlock, as above, which is relatively uncomplicated.

In general, the present invention relates to an interlock that is operative between the transmission operating range drive selector and the foot-operated brake pedal of a motor vehicle. A lock engaging lug is presented from the shifting mechanism of the transmission, operatively to interact with a lock, in the nature of a dead bolt, in the interlock.

The interlock presents a plunger that is biased to maintain contact with, and thus to move axially in response to the swinging movement of, the lever arm from which the pedal of the foot brake is presented. The dead bolt is adapted to be moved into and out of interfering engagement with the lock engaging lug. A push-pull control cable having an outer sheath and a core slidably received within the outer sheath interconnects the plunger to the dead bolt. Specifically, the core has a first end that is operatively secured to the plunger and a second end that is operatively attached to the dead bolt by a spring-biased, most motion connector. An independent, first spring biasing means acts on the plunger, and a second spring biasing means acts on the dead bolt to assure that the plunger and the dead bolt will move either concurrently, or independently, to effect the desired disposition of the dead bolt with respect to the lock engaging lug in response to the disposition of the lever arm from which the foot pedal is presented.

An interlock embodying the concepts of the present invention may be independently operated, or it may be operated in combination with a brake light switch and/or a cruise control, deactivating switch.

The interlock is hereinafter described not only as an independent mechanism but also in conjunction with a combined switch mechanism which includes a sub-assembly for operating the brake lights and a sub-assembly for deactivating the cruise control, both in response to depression of the foot-operated brake pedal. Such descriptions are deemed sufficient to effect a full disclosure of the subject invention. The exemplary embodiments are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
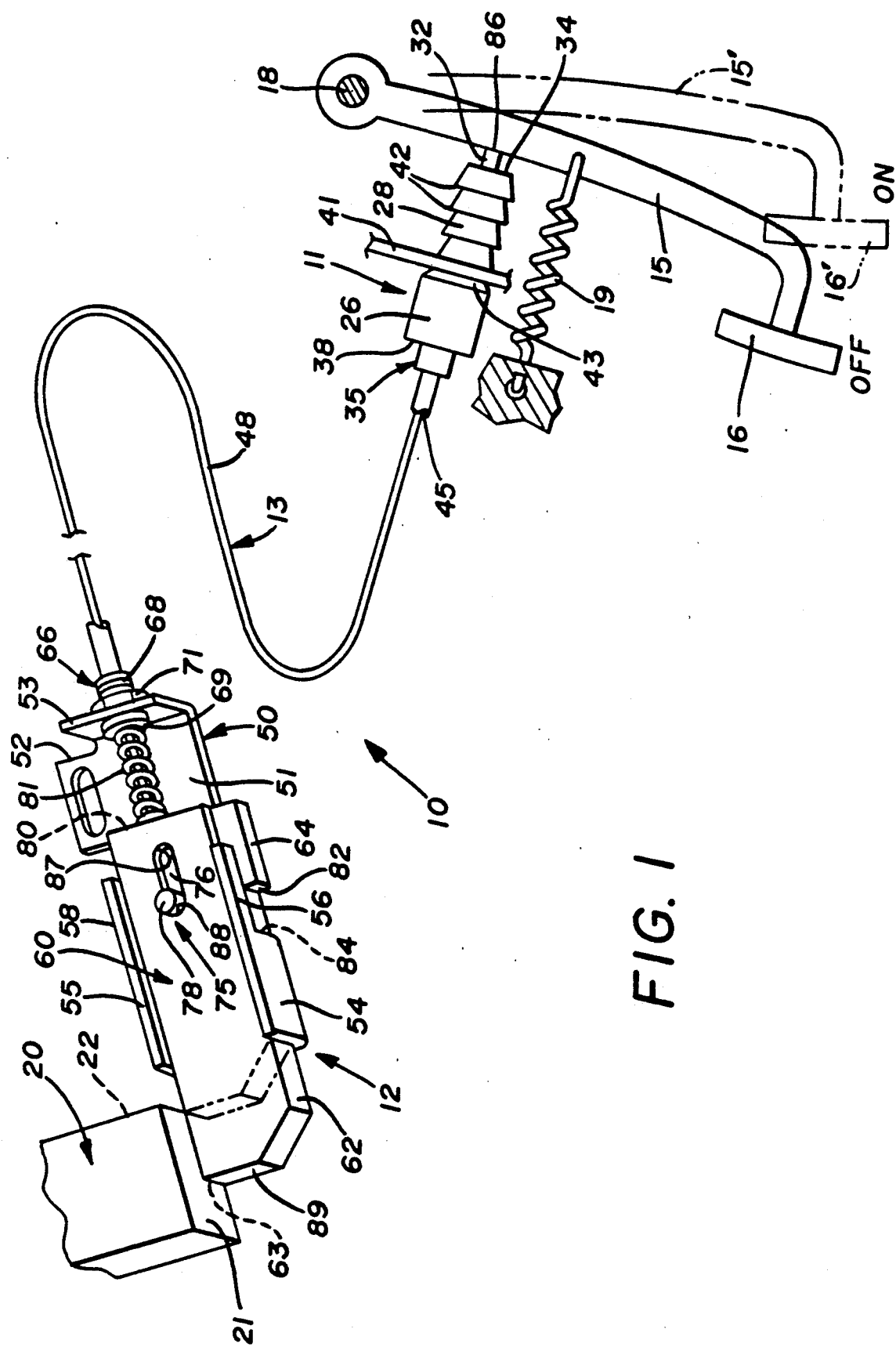
FIG. 1 is a schematic perspective of a interlock embodying the concepts of the present invention.

One representative form of an interlock embodying the concepts of the present invention is designated generally by the numeral 10 in FIG. 1 of the accompanying drawings. The representative interlock 10 utilizes an actuating assembly 11 (FIGS. 1 and 2) that is operatively connected to a dead bolt throw assembly 12 (FIGS. 3 and 4) by a push-pull control cable 13. The actuating assembly 11 is, in turn, operatively connected to the lever arm 15 of the vehicular foot brake, and the dead bolt throw assembly 12 is operatively connected to the transmission operating range drive selector (not shown).

As is commonly known, the braking mechanism of a motor vehicle may be actuated by depressing a foot pedal 16 that is presented from the outboard end portion of the lever arm 15. When the driver depresses the foot pedal 16, the lever arm 15 rotates about pivot pin 18 to actuate the brakes. The normal, at rest, position of the foot pedal 16 and the lever arm 15 are depicted by solid lines in FIG. 1, whereas the position of those components, when the foot pedal 16 has been depressed, is identified by the primed numbers 16' and 15', respectively, and is represented by phantom, or chain lines, in FIG. 1. The lever arm 15 is continually biased from the depressed position 15' toward its at rest position 15 by a return mechanism, such as the tension spring 19.

It is also well known in the art that an automatic transmission utilizes an operating range, drive selector (not shown), the mechanism of which permits the driver to select Park, Neutral, Reverse or one of several forward Drive ranges. Irrespective of whether the mechanism of the operating range, drive selector rotates, or moves linearly, manipulation of a selecting lever permits the driver to choose the desired operating range for the automatic transmission, and for the purposes of the present invention the mechanism of the transmission operating range drive selector may include a lock engaging lug 20 which either rotates, or is linearly displaced, in response to movement of the selecting lever (not shown) by which the vehicle operator, or driver, selectively shifts into, or out of, the transmission operating ranges.

The lock engaging lug 20 may, as depicted, be bar-shaped. However, for the purposes of the present invention it is necessary only that the lock engaging lug 20 have a locking face 21 (which may be the end wall depicted) and at least one transitional, striker surface 22 (the edge wall, as depicted). The functions of the locking face 21 and the striker surface 22 will be hereinafter more fully explained. Because transmission operating range selector mechanisms are so well known to the art, no depiction or detailed description, of the transmission operating range selecting mechanism is presented. Only the lock engaging lug 20 has been schematically depicted.

Figure 2:
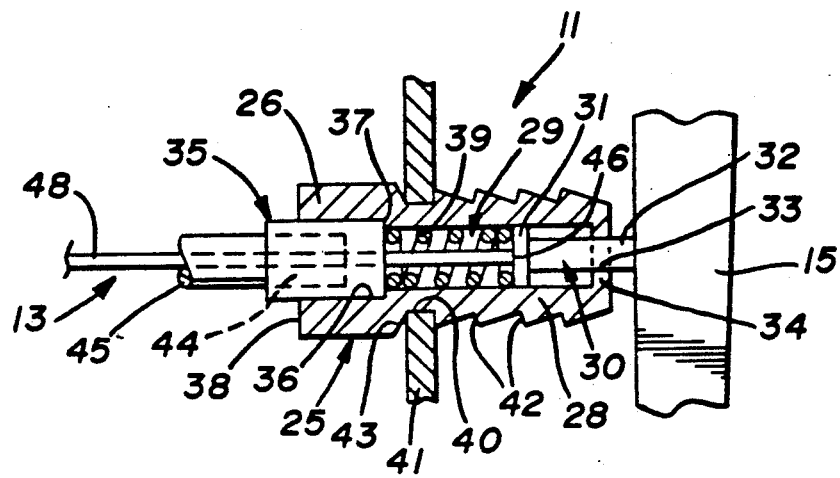
FIG. 2 is an enlarged, longitudinal cross section through the actuating assembly of the interlock depicting the engagement the actuating assembly with brake pedal.

The actuating assembly 11, as best seen in FIG. 2, has a housing 25 which includes a main body portion 26 and a nose portion 28. An interior chamber 29 extends through the main body portion 26 and substantially through the nose portion 28. A plunger 30 reciprocates within the chamber 29. Specifically, the plunger 30 has a cylindrical head portion 31 which slidably translates axially within the cylindrical chamber 29. The plunger 30 also has a shaft portion 32 which extends axially outwardly from the head portion 31 to be slidably received through a bore 33 which penetrates end wall 34 in the nose portion 28.

A coupling member 35, the primary purpose for which is more fully hereinafter described, is anchored within a counterbore 36 in the case wall 38 of the main body portion 26. The coupling member 35 registers with the interior chamber 29. The secondary purpose of the coupling member 35 is to provide an anchor surface 37 against which a first compression spring 39 may react. The first compression spring 39 is received within the interior chamber 29 and is disposed between anchor surface 37 on the coupling member 35 anchored within the counterbore 36 and the head portion 31 of the plunger 30, biasingly to protract the shaft portion 32 of the plunger 30 outwardly through the bore 33 for a purpose more fully hereinafter described.

The housing 25 is adapted to be mounted in proximity to the lever arm 15 of the foot brake, and for that purpose the exterior of the nose portion 28 may be inserted through a suitably disposed aperture 40 which penetrates the floorboard 41 of the vehicle. A plurality of anchoring barbs 42 are disposed axially along the exterior of the nose portion 28 to engage the perimeter of the aperture 40 and thereby preclude withdrawal of the nose portion 28 after it has been inserted into the aperture 40. A moderately conical, stop shoulder 43 defines the intersection between the main body portion 26 and the nose portion 28 on the exterior of the housing 25, and the shoulder 43 determines the full extent to which the nose portion 28 may be inserted into the aperture 40 through the floorboard 41. As should now be apparent, the aperture 40 is located such that the shaft portion 32 of the plunger 30 will engage the lever arm 15 of the foot brake as the plunger 30 is biasingly protracted by the action of the first compression spring 39.

In order operatively to connect the actuating assembly 11 to the dead bolt throw assembly 12, one end 44 on the outer sheath portion 45 of the push-pull control cable 13 is secured to the coupling member 35. This is the primary function of the coupling member 35. The corresponding, first end 46 of the core 48 that is received within the outer sheath portion 45 is secured to the head portion 31 of the plunger 30.

The foregoing description delineates an exemplary construction for the actuating assembly 11 and suggest a one way in which the actuating assembly 11 may be operatively secured to the push-pull control cable 13. As such, it should now be apparent that axial movement of the plunger 30 effects corresponding axial translation of the core 48 within the outer sheath portion 45.

Figure 3:
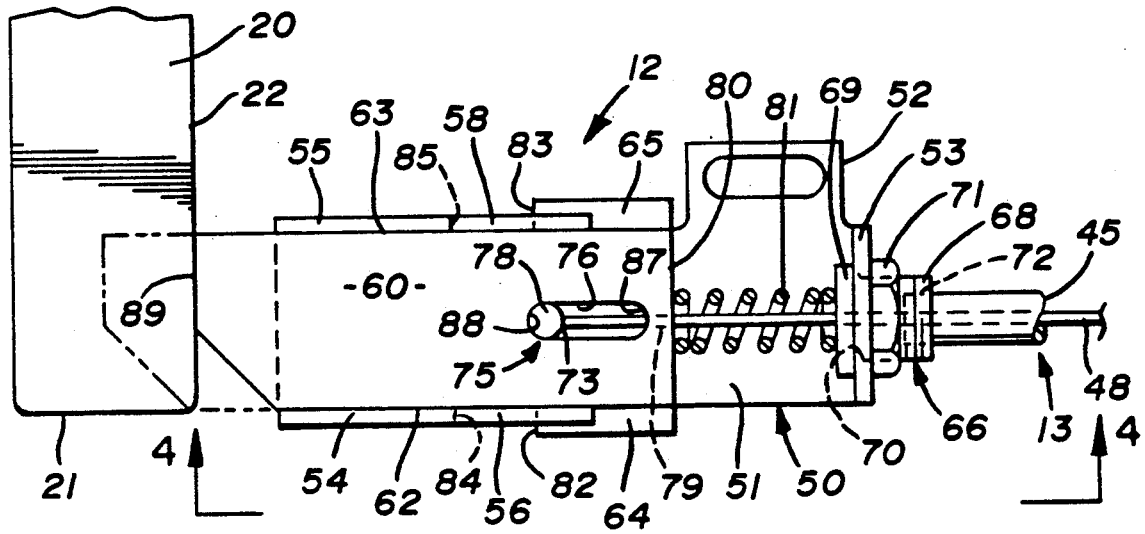
FIG. 3 is an enlarged, plan view of a dead bolt throw assembly utilized in the interlock depicted in FIG. 1.
Figure 4:
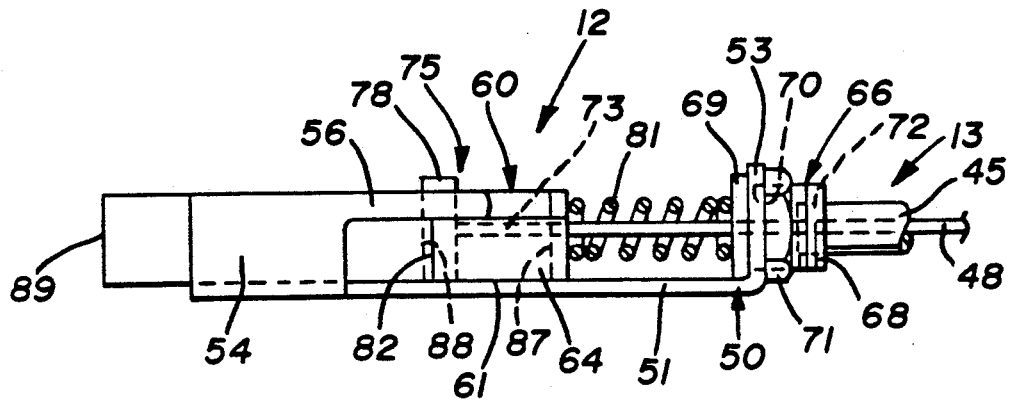
FIG. 4 a side elevational view taken substantially line 4—4 of FIG. 3.

With more particular reference now to FIGS. 3 and 4, it will be seen that the dead bolt throw assembly 12 has a frame housing 50. The frame housing 50 has a base plate 51, and a mounting bracket 52 may conveniently extend laterally outwardly from a portion of at least one, lateral edge on the base plate 51. A butt plate 53 extends perpendicularly from one longitudinal end of the base plate 51, and a pair of laterally spaced side plates 54 and 55 extend perpendicularly from the lateral edges of the base plate 51. As best seen in FIG. 4, the side plates 54 and 55 are each partially undercut to present cantilevered retaining flanges 56 and 58 which lie not only coplanar with their respective side plates 54 and 55 but also in spaced vertical relation with respect to the base plate 51.

A dead bolt 60 is slidingly mounted in the frame housing 50. The dead bolt 60 may well be of generally rectilinear cross section, in which case one planar face 61 thereof may slidingly engage the base plate 51, and the lateral edges 62 and 63 thereof may slidingly engage the respective side plates 54 and 55 on the frame housing 50. A pair of wing-like locating appendages 64 and 65 extend outwardly from the lateral edges 62 and 63 of the dead bolt 60 to be slidably received beneath the retaining flanges 56 and 58, respectively. With the locating appendages 64 and 65 thus captured beneath the respective retaining flanges 56 and 58, the dead bolt 60 is secured to the frame housing 50 and yet may be freely reciprocate with respect thereto.

A second coupling connector 66 has a threaded barrel portion 68, one end of which terminates in a radially extending stop flange 69. The barrel portion 68 is receivable through a bore 70 in the butt plate 53, and a nut 71 may be tightened on the barrel portion 68 in opposition to the stop flange 69 in order to secure the second coupling connector 66 to the butt plate 53. The second end 72 on the outer sheath portion 45 of the push-pull control cable 13 is secured to the second coupling connector 66 in a manner well known to the art. Typically, the coupling connector 66 may be swaged onto the second end portion 72 of the sheath portion 45. The second end 73 of the core 48 extends through the second coupling connector 66 and is attached, as by a lost motion connector 75, to the dead bolt 60.

The lost motion connector 75 includes a slot 76 that is oriented transversely with respect to the planar face 61 of the dead bolt 60 and is elongated in longitudinal alignment with the disposition of the core 48 as it extends longitudinally outwardly from the second coupling connector 66. A terminal plug 78 is received for reciprocating translation within the slot 76. The second end 73 of the core 48 passes through a small bore 79 which is aligned with the slot 76 and extends from the transverse, rear wall 80 of the dead bolt 60 into the slot 76. The second end 73 of the core 48 is secured to the terminal plug 78 within the slot 76. A second compression spring 81 extends between the transverse, rear wall 80 on the dead bolt 60 and either the butt plate 53 or the second coupling connector 66 that is secured to the butt plate 53.

As will become apparent from the operational description which follows, the force applied by the first compression spring 39 (FIG. 2) must exceed the force that can be applied by the second compression spring 81. In addition, the force applied by the tension spring 19 (FIG. 1) must exceed the combined forces applied by the first and second compression springs 39 and 81, respectively.

Before proceeding with the operational description of the interlock 10, it should be appreciated that engagement of the leading edges 82 and 83 on the respective locating appendages 64 and 65 with the opposed edges 84 and 85 on the side plates 54 and 55, respectively, determines the maximum extent to which the dead bolt 60 may extend outwardly with respect to the frame housing 50 (to the left as viewed in FIGS. 1, 3 and 4).

BASIC OPERATION OF THE INTERLOCK

When the motor vehicle transmission is in the Park position—and the foot pedal 16 is not depressed —the lateral, blocking edge 63 of dead bolt 60 is disposed in contiguous juxtaposition with the locking face 21 of the lock engaging lug 20 (as depicted in FIG. 1). If the vehicle operator attempts to shift the transmission into any Drive range, either one of the forward ranges or the Reverse, the lock engaging lug 20 presented from the transmission operating range selecting mechanism is prevented from traveling in the necessary direction because the locking face 21 on the lock engaging lug 20 will abut, and cannot travel past, the lateral, blocking edge 63 of the dead bolt 60. Thus, with the components disposed as depicted in solid line in FIG. 1, none of the Drive ranges nor the Reverse drive range can be engaged.

By depressing foot pedal 16, which pivots the lever arm 15 about pin 18 in a direction away from the actuating assembly 11 (i.e. —counterclockwise, as viewed in FIG. 1, to the position depicted in phantom, or chain line), the first compression spring 39 biases the plunger 30 to extend, or protract, outwardly from the nose portion 28 of the housing 25 so that the free end 86 of the shaft portion 32 follows, and attempts to remain in contact with, the lever arm 15. This protraction of the plunger 30 applies a tensile force to, and axially displaces, the core 48 to drive the terminal plug 78 against the first end 87 of the slot 76, thereby translating the dead bolt 60 to the phantom, or chain line, position represented in FIG. 1 so that the lock engaging lug 20 may be moved without being restricted by the dead bolt 60. This translation of the dead bolt 60 can only occur if the force applied by the first compression spring 39 exceeds the force applied by the second compression spring 81. That is, the force exerted by the first compression spring 39, in order to protract the plunger 30, must be sufficient to compress the second spring 81 between the transverse, rear wall 80 of the dead bolt 60 and the butt plate 53. As soon as the dead bolt 60 is thus translated to the chain line position depicted in FIG. 1, it clears the lock engaging lug 20, and the operator is able to move the transmission operating range drive selector, thereby effecting a shift into the selected drive range. As should now be apparent, this can only be done in response to the actuation of the foot-operated brake pedal.

When the operator releases the foot pedal 16, the lever arm 15 pivots about pin 18 in response to the biasing force applied by the tension spring 19. Specifically, the tension spring 19 swings the lever arm 15 clockwise from the position depicted in chain line to the position depicted in solid line in FIG. 1. In order for the lever arm 15 fully to swing from the disposition depicted in phantom to the disposition depicted in solid line, the force applied by the tension spring 19 must at least be equal to, and preferably be greater than the combination of the relative strengths of the first and second compression springs 39 and 81, respectively.

Translation of the plunger 30 by the clockwise rotation of the lever arm 15 compresses the first compression spring 39 and applies a compressive force to the core 48, thereby effecting axial translation of the core 48 in the push-pull control cable 13. Translation of the core 48 under compressive force moves the terminal plug 78 away from the first end 87 of the slot 76 in the dead bolt 60. In response to this movement of the terminal plug 78, the biasing action of the second compression spring 81 urges the dead bolt 60 to move with the terminal plug 78. If the transmission operating range selecting mechanism has effected a shift into any of the Drive ranges or the Reverse range, the lock engaging lug 20 will be positioned, as depicted by the solid line representation in FIG. 3, so that the transitional, striker surface 22 on the lock engaging lug 20 will be engaged by the transverse outboard end 89 on the dead bolt 60 in order to preclude translation of the dead bolt 60 to the left, also as viewed in FIG. 3. When the dead bolt 60 is precluded from so moving with the terminal plug 78, the terminal plug 78 will simply move within the slot 76 toward the second end 88 of the slot 76. As such, the slot 76 and terminal plug 78 perform the function of a lost motion device.

As long as the vehicle transmission remains in either the Reverse, or one of the Drive ranges, the transverse, outboard end surface 89 of the dead bolt 60 will remain in engagement with the transitional, striker surface 22 on the lock engaging lug 20, and this disposition of the parts is maintained until the transmission operating range drive selector is returned to the Park position. Whenever the transmission drive selector is returned to the Park position, the lock engaging lug 20 is moved to clear the path along which the dead bolt 60 moves. Typically, this situation would occur when the motor vehicle is brought to a halt, and the transmission operating range drive selector has been moved into the Park position. In that situation, when the foot pedal 16 is released, the biasing force provided by the second compression spring 81 causes the dead bolt 60 to travel from the solid line position depicted in FIG. 3 to the phantom position in that figure. As such, the components return to their positions depicted in, and described in conjunction with, FIG. 1. The second compression spring 81 thus serves to provide a biasing action on the lost motion connector 75.

As should now be understood, if the vehicle operator attempts to move the drive selector lever from the Park position into either the Reverse, or any of the Drive, ranges without depressing the foot brake, the dead bolt 60 obstructs the path along which the lock engaging lug 20 travels, thereby precluding a shift until the foot pedal 16 has been depressed.

If the vehicle operator attempts to force the drive selector from its Park position to the Reverse or one of the Drive ranges without depressing the foot pedal 16, the force applied by the lock engaging lug 20 to the lateral, blocking surface 63 on the dead bolt 60 will be increased. However, it should be noted that in this situation none of the force so applied to the drive selector inhibits, or otherwise restricts, actuation of the foot pedal 16, or swinging of the lever arm 15.

ADAPTING INTERLOCK TO BRAKE LIGHT AND/OR CRUISE CONTROL SWITCHES

It is well known in the art to provide motor vehicles with brake light switches which are activated when the operator applies the foot brake. It is also well known to incorporate a cruise control deactivating switch in conjunction with the brake light switch in order to reactivate cruise control upon application of the foot brake. An interlock 10 embodying the concepts of the present invention may be independently operated, or it may be operated in combination with a cruise control deactivating switch and/or brake light switch.

Figure 5:
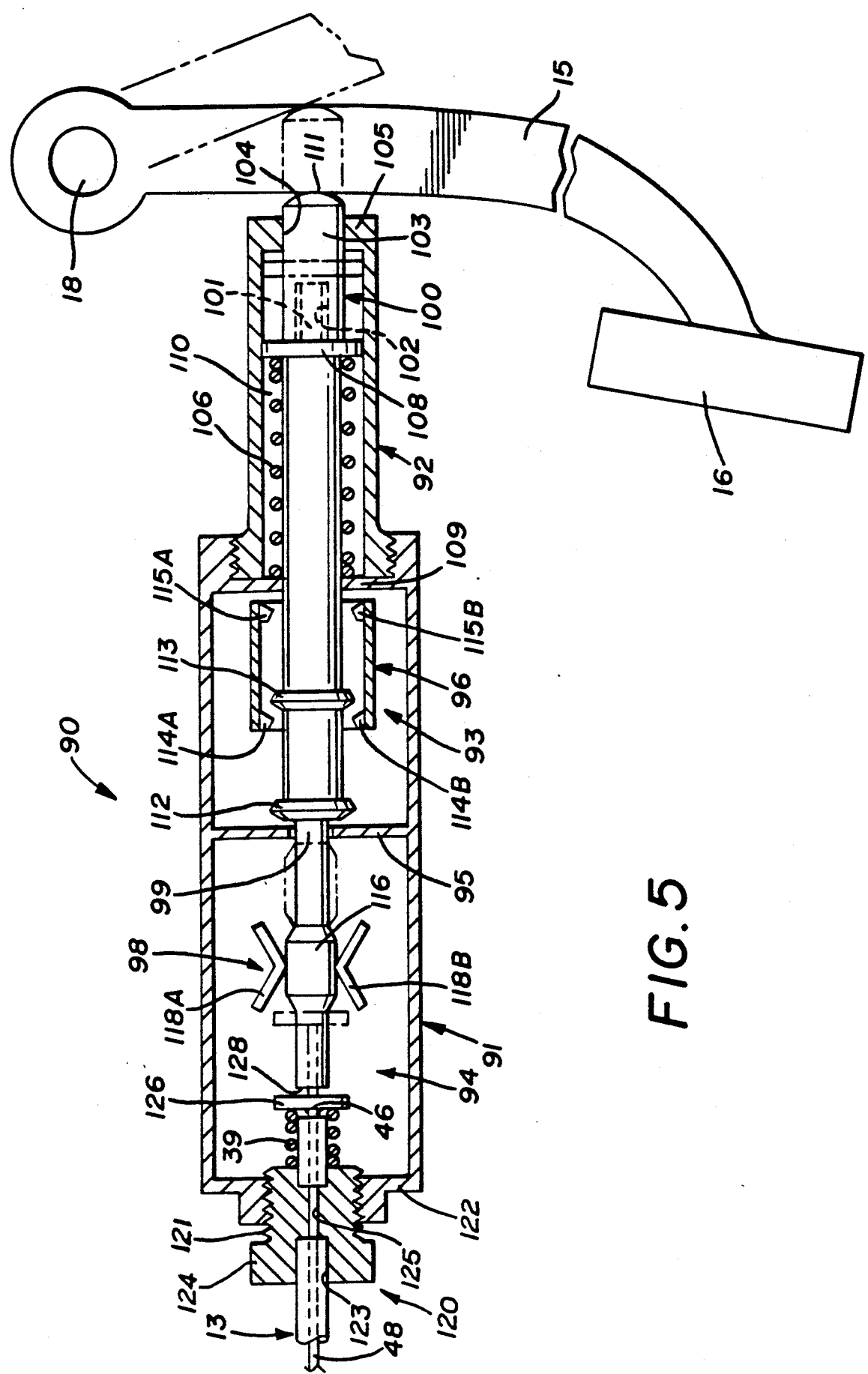
FIG. 5 an enlarged, longitudinal cross section depicting an alternative embodiment of the actuating assembly operatively connected to a foot-operated, brake pedal through a combined switch assembly used to operate the brake lights and deactivate the cruise control.

As depicted in FIG. 5, a combined brake light and cruise control deactivating switch assembly, as known in the art, is generally identified in FIG. 5 by the numeral 90. The combined switch assembly 90 has a main housing 91—within which the hereinafter briefly described switching sub-assemblies may be received — and a housing extension 92 within which a portion of the hereinafter briefly described switch actuating mechanism may be received. The main housing 91 may itself be separated into first and second compartments 93 and 94, respectively, by a transverse wall 95. A switch sub-assembly 96 to operate the brake lights upon depression of the foot pedal 16 may be received within the first compartment 93, and a cruise control, deactivating switch sub-assembly 98 may be received within the second compartment 94 The switch sub-assemblies 96 and 98 may be simultaneously operated to effect the desired results by a common switch actuating mechanism in the form of a shaft 99. The shaft 99 extends longitudinal within the compartments 93 and 94 of the main housing 91 and into the housing extension 92. So disposed, the shaft 99 is axially translatable.

A plunger 100 is axially translatable within the housing extension 92, and the shaft 99 is axially aligned with, and operatively connected to, a plunger 100. For example, a threaded connecting stub 101 may extend axially outwardly from one end of the shaft 99 to be secured within an oppositely disposed, threaded bore 102 in the plunger 99. The conjoined switch actuating shaft 99 and plunger 100 are also biased to extend, or protract, the shaft portion 103 of the plunger 100 outward through a bore 104 in the end wall 105 of the housing extension 92. The biasing action can be achieved by the use of a compression spring 106 which extends between the head portion 108 of the plunger 100 and the end wall 109 of the main housing 91. The head portion 108 extends radially outwardly from the shaft portion 103 to be slidably received within the cylindrical, interior cavity 110 of the housing extension 92. The outboard end 111 on the shaft portion 103 of the plunger 100 engages the lever arm 15 and is so maintained by the biasing force applied to the plunger 100 by the compression spring 106.

That portion of the shaft 99 which extends through the first compartment 93 carries an axially spaced pair of contact rings 112 and 113 which are presented to engage with, and disengage from, the opposed pairs of contact ribs 114A and 114B as well as contact ribs 115A and 115B, respectively, within the brake light switch sub-assembly 96 upon selected axial translation of the shaft 99. Similarly, that portion of the shaft 99 which extends through the second compartment 94 carries a contact ring 116 which is presented to engage, and disengage, the opposed contact ribs 118A and 118B within the cruise control deactivating switch sub-assembly 98, also upon selected axial translation of the shaft 99

The normal, at rest, position of the foot pedal 16 and the lever arm 15 are depicted by solid lines in FIG. 5, whereas the position of those components, when the foot pedal 16 has been depressed, is represented by phantom, or chain lines, in FIG. 5. Here, too, the lever arm 15 is continually biased to its at rest position by a return mechanism, not shown.

A coupling member 120 has a threaded barrel portion 121 which may be received within the second end wall 122 of the main housing 91. One end on the outer sheath portion 45 of the push-pull control cable 13 is secured to the coupling member 120, as by being swaged within an end bore 123. For reasons that will become apparent, the outer surface of the coupling member 120 may be stepped to present a shoulder 124. The core 48 extends through the outer sheath portion 45 of the push-pull cable 13 as well as through an axial passage 125 within the coupling member 120 to terminate within the compartment 94, at which location the core 48 is secured to an end cap 126. The size and location of the end cap 126 are such that the end cap may be axially translated within the compartment 94. The customary first compression spring 39 for a interlock 10 extends between shoulder 124 and the end cap 126 to perform the same function as the first compression spring utilized in conjunction with the actuating assembly depicted in FIGS. 1-4, inclusive, and identified by the same numerical designation.

OPERATION OF INTERLOCK IN CONJUNCTION WITH BRAKE LIGHT AND/OR CRUISE CONTROL SWITCH

With specific reference to FIG. 5, it must be understood that this figure represents only a different way in which to effect actuation of the dead bolt throw assembly 12, which was described with respect to FIGS. 1, 3 and 4, inclusive. As such, translation of the core 48 in the push-pull control cable 13 responsive to the foot pedal 16 achieves the same movement of, and the same effect created by, the dead bolt 60 relative to the lock engaging lug 20.

Accordingly, when the foot pedal 16, and the lever arm 15 from which the foot pedal 16 is presented, are in their normal, at rest, position, as depicted in solid line in FIG. 5, the brake light switch sub-assembly 96 is "open" and the cruise control deactivating switch sub-assembly 98 is "Closed." The open condition of switch sub-assembly 96 is effected when electrical transmission cannot occur across either the contact ribs 114A and 114B or the contact ribs 115A and 115B. This occurs because the contact rings 112 and 113 are axially displaced not only with respect to the contact ribs 114A and 114B but also with respect to the contact ribs 115A and 115B, respectively.

Conversely, the closed condition of the switch subassembly 98 is effected when the contact ring 116 engages the contact ribs 118A and 118B to allow the transmission of electrical current between the contact ribs 118A and 118B. This condition is also depicted in solid line in FIG. 5. Thus, when the foot pedal 16 is in its normal, at rest, position, the brake lights are "off" but the cruise control may be operated.

In the normal, at rest, position of the foot pedal 16 the first compression spring 39 holds the end cap 126, which is secured to the first end 46 of the core 48, in engagement with the free end 128 of the shaft 99. When the end cap 126 is so disposed, and the transmission operating range; drive selector is in the Park position, the components of the dead bolt throw assembly 12 are disposed in the solid line position depicted in FIG. 1. Thus, the vehicle operator cannot shift the drive selector out of Park and into any of the Drive ranges or the Reverse range, because the dead bolt 60 effectively blocks the required movement of the lock engaging lug 20.

However, when the vehicle operator depresses the foot pedal 16 so that the lever arm 15 swings counterclockwise about pivot pin 18 to the position depicted in phantom, or chain line, in FIG. 5, the compression spring 106 translates the shaft 99 and the plunger 100 axially to keep the outboard end 111 on the shaft portion 103 of the plunger 100 in engagement with the lever arm 15. Such axial translation of the shaft 99 "closes" the switch sub-assembly 96 and "opens" the switch sub-assembly 98. That is, the contact rings 112 and 113, respectively, engage the contact ribs 114A and 114B and the contact ribs 115A and 115B to close the electrical circuit across the associated pairs of contact ribs 114A and 114B as well as contact ribs 115A and 115B. Closing these circuits turns the brake lights "on." Simultaneously, the contact ring 116 disengages from the contact ribs 118A and 118B to break the electrical circuit thereacross, thus either interrupting, or precluding, operation of the cruise control.

Concurrently with the translation of shaft 99, the compression spring 39 urges the end cap 126 to follow the shaft 99, thus applying a ansile force to the core 48 which acts to translate the dead bolt 60 from the solid line position depicted in FIG. 1 to the chain line position depicted therein so that the lock engaging lug 20 is free to move, as required, for the transmission, operating range, drive selector to be shifted from the Park position into any of the Drive ranges or the Reverse range.

In the event that the vehicle operator attempts to force the shift out of the Park position by applying excessive force to the shift lever prior to depressing the foot pedal 16, the side load applied by locking face 21 on the lock engaging lug 20 against the lateral blocking edge 63 on the dead bolt 60 might preclude withdrawal of the dead bolt 60, but because the end cap 126 is not secured to the shaft 99, except by the biasing effect of spring 39, the compression spring 106 will translate the shaft 99 independently of the core 48 so that the brake lights and the cruise control deactivating switches will remain operative irrespective of the forces applied, even improperly, to the shift lever. When the operator releases the excess pressure applied to the drive selector, even momentarily, the compression spring 39 snaps the end cap 126 toward the free end 128 of the shaft 99, thereby translating the dead bolt 60 (to the phantom position depicted in FIG. 1) in order to free the lock engaging lug 20, and thereby the drive selector.

As should now be apparent, the present invention not only teaches that an interlock mechanism 10 embodying the concepts of the present invention can be operatively interposed between a transmission operating range drive selector and the brake foot pedal by a relatively simple mechanism but also that the other objects of the invention can likewise be accomplished.

The embodiments of the invention in which an exclusive property or privilege is claimed are defined as follows:

1. An interlock adapted to be operatively interposed between a lever arm of a foot brake and a lock engaging lug presented from a transmission operating range drive selector of a motor vehicle; the interlock comprising: a plunger; an actuating shaft operatively secured to said plunger; means to bias said plunger, and the actuating shaft operatively secured thereto, toward the lever arm of a foot brake; a switch assembly to actuate one or more electrically operated accessories in response to movement of the foot brake; said switch assembly having at least one open and one closed condition; movement of said actuating shaft effecting a change between the open and closed conditions of said switching means; a dead bolt adapted to be moved into and out of engagement with the lock engaging lug; a push-pull control cable having an outer sheath and a core slidably received within said outer sheath; said core having first and second ends; said first end of said core being operatively secured to an end cap and being urged into abutment with said plunger; spring means cooperating with said end cap for providing lost motion between said switch assembly and said push-pull control cable; and said second end of said core operatively attached to said dead bolt.

2. An interlock, as set forth in claim 1, further comprising: a spring-biased lost motion connector interposed between said core and said dead bolt.

3. An interlock, as set forth in claim 2, wherein said electrically operated accessories comprises: brake lights.

4. An interlock as set forth in claim 2, wherein said electrically operated accessories comprises: cruise control deactivating means.

5. An interlock, as set forth in claim 2, wherein said electrically operated accessories comprises: brake lights; and, cruise control deactivating means.

* * * * *